Patented Nov. 16, 1948

2,454,172

UNITED STATES PATENT OFFICE 2,454,172

METHOD OF MAKING SEAMLESS PLATINUM RUTHENIUM ALLOY CANNULAE

George M. Hickey, Paoli, and William W. Matlack, Malvern, Pa., assignors to J. Bishop & Co. Platinum Works, Malvern, Pa., a corporation of Pennsylvania No Drawing. Original application February 27, 1941, Serial No. 380,960. Divided and this application July 14, 1945, Serial No. 605,180

1 Claim. (Cl. 148—11.5)

This invention relates to a method for the production of seamless so-called platinum or platinum alloy cannulae for hypodermic needles.

In the past it has been customary to make the cannulae for so-called platinum hypodermic needles from platinum-iridium and platinum-gold alloys. The alloys most commonly used were 70% platinum with 30% iridium and 75% platinum with 25% gold.

The procedure generally followed in the manufacture of such platinum-iridium and platinum-gold cannulae consists in alloying the metals by melting and then casting an ingot thereof. In the case of platinum-iridium the ingot is hot forged and cold rolled to a thickness of about .015 inch and then cold rolled with intermediate annealing stages to the desired thickness, generally about .003 inch. From the resulting rolled sheet, strips are cut to a predetermined size and each strip is drawn into tubular form through a series of dies until the edges of the strip are brought closely together, i. e. exactly butted together but not overlapping. Then a piece of small diameter gold wire, generally .005 inch, is inserted within the tube and held in place over the butted edges of the open seam tube. The tube and wire are then passed through a flame of such a temperature as to almost instantly melt the gold wire which enters into the seam and also deposits on the inside of the tube over the seam. The resulting tube is then tested for leaks and, if satisfactory, is drawn through a succession of dies to the desired finished size.

The manufacture of platinum-gold tubing is similar to the general procedure described above for the manufacture of platinum-iridium tubing except that the platinum-gold alloy is not hot worked, although it is subjected to annealing at predetermined stages.

During the gold soldering operation described above, it is necessary in the case of platinum-iridium to heat the tube within a very narrow temperature range and within a very short period of time, i. e. about one or two seconds. If the temperature is too high or if the tube is heated for too long a time the gold solder combines with the platinum-iridium and forms a very brittle alloy. If, on the other hand, the temperature is not high enough only a partial or incomplete bond is achieved and in some instances there is no bond at all. If a poor bond is formed the tube may open either during the final manufacturing operation or in use.

The same limitations apply in the soldering of platinum-gold tubing with gold but to a lesser degree.

It is to be observed that in the above described procedure at no time after the tube has been soldered is a mandrel or arbor used inside either the platinum-iridium or the platinum-gold tube for the purpose of supporting the tube wall during drafting or for the purpose of smoothing out irregularities on the inside of the tube. It has been found to be impractical to use a mandrel or arbor for these purposes within the soldered tubes because the brittle nature of the seam or area adjacent to the seam precludes following the common practice of subsequently expanding the tube by mechanical means to permit the mandrel or arbor to be withdrawn.

Since the practice of gold soldering does not produce uniformly smooth internal surfaces, cannulae made by this practice frequently contain internal irregularities which permit the accumulation of objectionable foreign substances.

At times excessive gold solder will remain inside the tube in the form of a film and will flow and form small beads on the inside of the tube if the needle is heated excessively during flame sterilization. Such beads may partly or even wholly close the cannulae and thus retard or prevent the flow of the liquid to be injected.

When the gold-soldered tubing is made into needles the soldered seam may open because of imperfect bonding or because of embrittlement of the alloy adjacent the seam.

Further, when the soldered cannulae are being pointed care must be taken that the seam comes at the top or heel of the point.

All of these disadvantages increase the cost and lower the value of an inherently expensive article.

An object of the present invention is to produce tubing, cannulae and needles which shall have all of the advantages of the gold-soldered platinum-iridium and platinum-gold tubing, cannulae and needles heretofore produced and which shall be free of many of their disadvantages. This object is attained in accordance with the present invention by so manipulating the alloy as to produce seamless tubing, cannulae and needles therefrom.

Some of the desirable characteristics of cannulae and hypodermic needles are the following:

(1) They must be stiff but not brittle.

(2) They must be free of structural imperfections such as cracks, roughness, etc.

(3) They must be capable of flame sterilization without damage such as loss of stiffness or development of brittleness.

(4) They must not split or clog especially as a result of flame sterilization.

(5) They must not tarnish or corrode.

(6) They must have a uniform grain structure and hardness.

(7) The manufacturing process should be relatively simple and inexpensive and the product uniform and reliable.

(8) The tubing should be capable of being cut and of being mounted in the needle hub without splitting or collapsing.

(9) They should not be excessively costly.

We have found that alloys of platinum and ruthenium of suitable grain structure, hardness and stiffness may be fabricated into seamless tubes suitable for use as the cannulae for hypodermic needles and that such needles have in general all of the advantages and none of the disadvantages of the gold-soldered platinum-iridium and platinum-gold needles discussed above. We started with an alloy of about 89% platinum and about 11% ruthenium because this alloy in the cold-worked state has a hardness comparable with that of the alloy of 70% platinum and 30% iridium heretofore used for needles but we have found that the composition of the alloy may vary within the range from 8–20% of ruthenium and from 92 to 80% of platinum. The substitution of part of either or both the platinum and ruthenium by palladium, iridium and rhodium or combinations thereof in amounts which do not alter the essential workable characteristics of the alloy for use as cannulae for hypodermic needles and the presence of other metals in inconsequential amounts is not excluded. We have found, for instance, that alloys containing 15% and more by weight of ruthenium, the remainder being platinum, are workable into cannulae, possess greater hardness than the 11% alloy and are otherwise suitable for use in hypodermic needles. The hardness is referred to particularly because sufficient hardness and stiffness without brittleness are outstanding characteristics of hypodermic needles made of such platinum-ruthenium alloys. Incidentally, the platinum-ruthenium alloys have a lower specific gravity than platinum-iridium and platinum-gold alloys and consequently yield a greater quantity of cannulae per unit of weight.

Seamless tubing of the platinum-ruthenium alloys may be made by any of the following three methods:

(1) By making a relatively large, open-seamed tube, fusing together the abutting edges without the use of a welding or soldering material and proceeding with the tube drawing practice within the limits of annealing and mechanical working described below.

(2) By deep drawing a cup from a sheet of the alloy and proceeding with the tube drawing practice described below.

(3) By casting a round ingot, hot working and then drilling it lengthwise to form a tube, and then proceeding with the tube drawing practice described below.

All three of the above methods of forming the initial tube are known in other relations but are, so far as we are aware, novel in the production of satisfactory platinum alloy cannulae for hypodermic needles.

The initial steps of methods 2 and 3 are applied to the platinum-ruthenium alloys in exactly the same way as to other metals in the production of tubing and therefore need not be described in detail. The tube drawing practice of methods 2 and 3 is the same as in method 1 and will be described in the following detailed description of method 1.

The platinum-ruthenium alloy, e. g. an alloy of about 89% platinum and 11% ruthenium is produced by melting the elements together and casting an ingot. The ingot is hot forged and hot rolled to a sheet of about .050 inch thickness. The sheet is then alternately cold rolled and annealed until a thickness of about .020 inch is reached. At this thickness the sheet is cut into strips of suitable size, say 18 inches long by .875 inch wide, and bent to a U-shape cross section in a succession of open dies using a round arbor to maintain the inner contour. The U-shape piece is removed from the last of the succession of open dies and the edges are brought down snugly on the arbor by hammering and then both tube and arbor are passed through a swaging machine in order to bring the edges tightly together. The arbor is then removed and after proper cleaning the edges are fused together. The size of the tube will be about .187 inch internal diameter and .227 inch external diameter. It will be understood that in the foregoing the thickness of the sheet and the size of the tube are given merely as examples and not as limitations. Both the thickness of the sheet and the diameter of the tube may be varied.

Care must be taken in fusing together the edges of the tube. The fused section has the nature of a cast structure and for this reason the tube is next thoroughly annealed at a temperature not less than 2000° F. in order to produce a more homogeneous structure by reduction of the dendrites in the cast metal.

It is observed that at this point the diameter of the seamless platinum-ruthenium tube is much larger and the walls are much thicker than the platinum-iridium and platinum-gold tubes heretofore produced by gold-soldering as described above. This has a distinct advantage in that it permits a more extensive working of the metal of the tube in reducing its diameter and wall thickness to that required for the cannulae, this work serving to remove all traces of the cast structure of the seam produced by fusing together the edges of the sheet in forming the tube and thereby to give a truly seamless tube.

The formed and annealed tube is now ready for reduction to the desired finished size. For example, if a hypodermic needle cannula of .025 inch outside diameter and .005 inch wall thickness is to be made, the following procedure is used. The formed and annealed tube is swedged over a mandrel to create a uniform wall thickness and smooth external and internal surfaces. It is then alternately annealed and swedged until the outside diameter has been reduced to .202 inch and the inside diameter to about .160 inch, the wall thickness being maintained at about .020 inch. The tube is then annealed and after cooling put on a .142 inch diameter mandrel and the tube and mandrel drawn through a die of .182 inch diameter, the tube wall thickness thus being maintained at .020 inch. The tube is then slightly expanded by passage through a swedging machine and the mandrel removed. The tube is then annealed, the .142 inch mandrel reinserted and the tube and mandrel drawn through a .169 inch diameter die. This reduces the tube wall thickness to .0135 inch. The mandrel is again removed, the tube annealed and then, by a series of five operations similar to that last described but using progressively smaller mandrels and dies, is brought to an external diameter of .098 inch and a wall thickness of .004 inch. At this point the last mandrel is removed and the tube is sunk, without further annealing or use of mandrels, through a succession of 11 dies to reduce the outside diameter of the tube to say .025 inch, the wall thickness thereby being increased to about .005 inch. The tube is then cut into suitable lengths, pointed and mounted as usual in the manufacture of hypodermic needles.

The above described drawing practice is, so far as we are aware, new as applied for the production of seamless tubing suitable for use as cannulae for hypodermic needles from platinum group metal alloys of sufficient hardness for this use. The method, i. e. the application of the drawing practice to such alloys, is the result of a careful study of the characteristics of platinum-ruthenium alloys containing 8 to 20% of ruthenium and of the relation of physically working the alloys within certain limits of both temperature and mechanical practice.

The tubing, cannulae and needles, as compared with platinum alloy tubing, cannulae and needles heretofore available, constitute a new and valuable addition to the field of hypodermic needles as a whole. They are characterized particularly by their freedom from any seam and by freedom from mechanical and metallurgical imperfections associated with a seam. The tubing or cannulae may serve for any of the variety of forms or types of hypodermic needles such as the Luer type, the spinal puncture type, the type commonly used in dental work, etc. The mandrel practice followed in the manufacture of the tubes has the highly important effect of producing tubes the insides of which are perfectly smooth, and it is significant that this inside smoothness persists through the treatment of the tubes following the mandrel practice.

The hypodermic needles made from the seamless tube or cannulae of platinum-ruthenium alloy containing from 8 to 20% of ruthenium have, as stated, the requisite hardness and stiffness without brittleness for parenteral therapy, are capable of being sterilized by heating to redness by means of an open flame repeatedly without loss of stiffness, are free of mechanical defects such as internal roughness, weak seams and tendency to split, are free of solder which might clog the tube upon flame sterilization, and are of uniform grain structure and free of segregation.

This application is a division of our application Serial No. 380,960, filed February 27, 1941, now abandoned.

We claim:

Method of making a seamless cannula for a hypodermic needle which comprises forming a tube of homogeneous platinum metal alloy, alternately annealing the tube and swedging the tube over a mandrel with reduction of the tube diameter while maintaining its wall thickness, alternately annealing the tube and drawing the tube on a mandrel with reduction of the tube diameter and wall thickness, and finally sinking the tube through a succession of dies to reduce its outside diameter to a size suitable for use as a hypodermic needle cannula, the platinum metal alloy consisting essentially of platinum alloyed with from about 8% to about 20% by weight of ruthenium and the seamless tube initially being formed by hot forging and hot rolling an ingot of the alloy to a thickness of about .050 inch, thereafter alternately annealing and cold rolling the sheet to a thickness of about .020 inch, forming the sheet into a tube, fusing together the edges of the sheet and annealing the resulting tube at a temperature not less than 2000° F.

GEORGE M. HICKEY.
WILLIAM W. MATLACK.

REFERENCES CITED

The following references are of record in the file of this patent:

UNITED STATES PATENTS

| Number | Name | Date |
|---|---|---|
| 1,295,430 | Carlson | Feb. 25, 1919 |
| 2,208,606 | Smith | July 23, 1940 |
| 2,300,353 | Eberhardt | Oct. 27, 1942 |
| 2,368,381 | Schmitt | Jan. 30, 1945 |